United States Patent [19]

Corwin

[11] Patent Number: 4,675,663
[45] Date of Patent: Jun. 23, 1987

[54] APPARATUS AND METHOD FOR INDICATING THE ROTATIONAL SPEED OF A FAN

[75] Inventor: Rollin K. Corwin, Houston, Tex.

[73] Assignee: Codep International, Inc., Houston, Tex.

[21] Appl. No.: 822,746

[22] Filed: Jan. 27, 1986

[51] Int. Cl.⁴ .............................................. G01P 3/44
[52] U.S. Cl. ...................................... 340/671; 416/61
[58] Field of Search ................... 340/540, 671; 416/61; 200/310, 308

[56] References Cited

U.S. PATENT DOCUMENTS

| | | | |
|---|---|---|---|
| 716,263 | 12/1902 | Mott | 340/671 |
| 3,505,595 | 4/1970 | Favre | 340/671 X |
| 3,559,065 | 1/1971 | Grundy | 340/671 X |

Primary Examiner—Jerry W. Myracle
Assistant Examiner—J. Roskos
Attorney, Agent, or Firm—Browning, Bushman, Zamecki & Anderson

[57] ABSTRACT

An apparatus and method for indicating the rotational speed of a fan is disclosed. An electrical circuit is provided for selectively providing electrical power to a plurality of indicator lights mounted on the fan. The indicator lights are turned on and off in a coded sequence that indicates the speed at which the fan is rotating.

6 Claims, 7 Drawing Figures

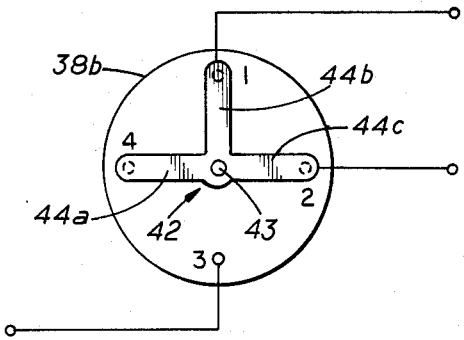
FIG. 3 (OFF)
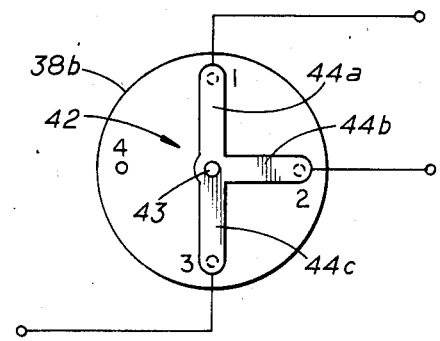
FIG. 4 (HI)
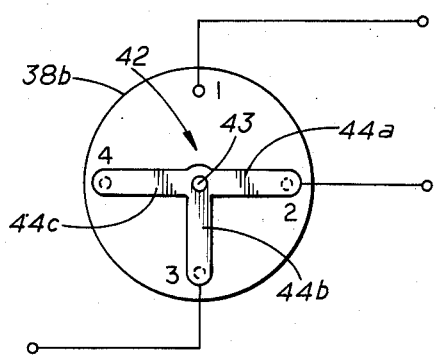
FIG. 5 (MED)
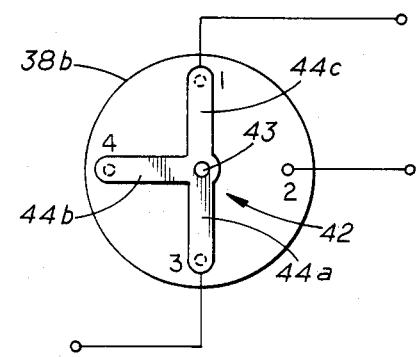
FIG. 6 (LOW)
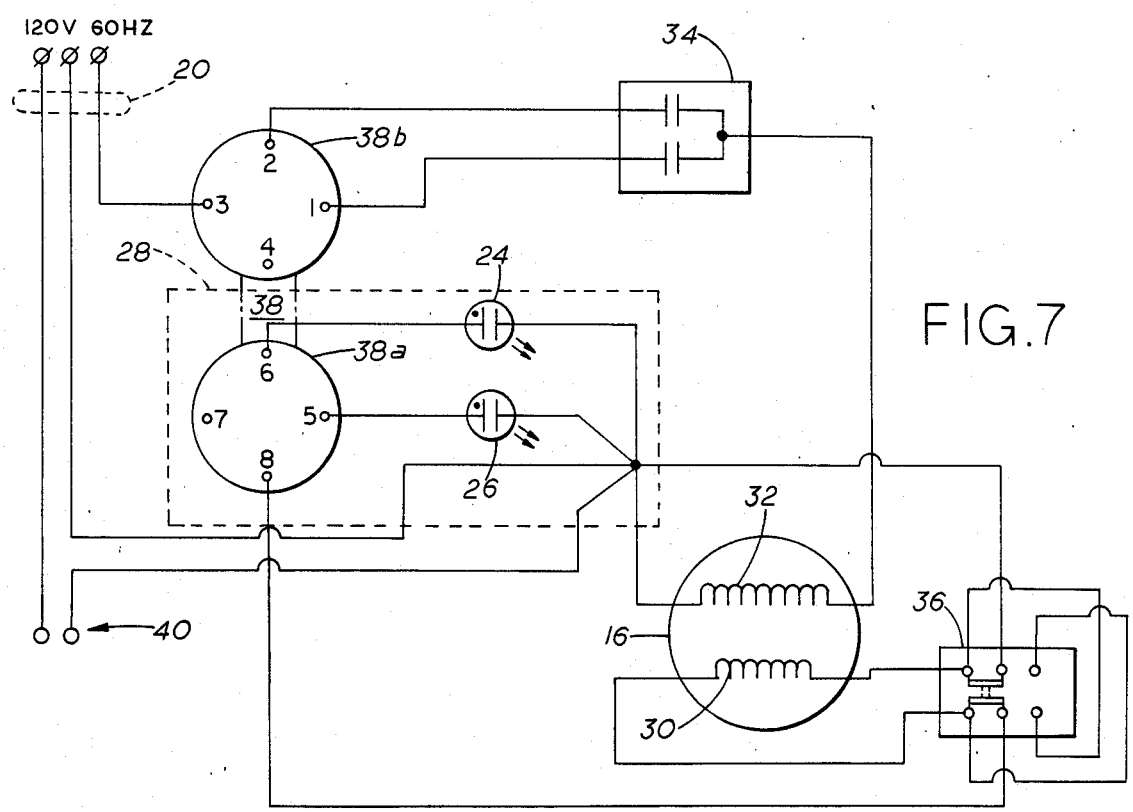
FIG. 7

APPARATUS AND METHOD FOR INDICATING THE ROTATIONAL SPEED OF A FAN

BACKGROUND OF THE INVENTION

1. Field of the Invention

The invention relates generally to fans and, more particularly, to an improved apparatus and method for indicating the rotational speed of a fan.

2. Description of the Background

It is often desirable to know the rotational speed of a fan while the fan is being operated. In the case of a ceiling fan, it may be difficult to judge the rotational speed just by looking at the rotating blades of the fan. When a single speed ceiling fan is first turned on, the blades begin to turn slowly at first as they overcome the inertia of being at rest. The blades increase their speed until the maximum speed is reached.

A ceiling fan with multiple speed settings operates similarly. However, in the case of a ceiling fan with multiple speed settings, it may be difficult to determine the speed setting of the fan by looking at the rotating blades of the fan. This is especially true during the period of time that immediately follows the switching on of the fan when the blades of the fan are just beginning to turn.

The present invention is directed toward providing a means for visually indicating the rotational speed of the blades of a ceiling fan.

SUMMARY OF THE INVENTION

The approach of the present invention is to use indicator lights to indicate the rotational speed of the fan. The indicator lights may be mounted in the body of the fan in such a manner that they may be visible for several feet. The indicator lights are turned on and off in a coded sequence to provide information concerning the rotational speed of the blades of the fan. The coding method employed to code the indicator lights utilizes a minimum number of indicator lights.

The apparatus of the invention generally comprises an electrical circuit connected to the electrical wiring of a ceiling fan. The circuit is adapted to transmit electrical power to indicator lights to cause the indicator lights to turn on and off in a specific predetermined sequence to indicate the rotational speed setting of the ceiling fan. The indicator lights are preferably colored neon filled lamps. The electrical circuit of the invention couples the fan switch mechanism to the indicator lights in a manner that insures the correct combination of indicator lights is always chosen for a given fan speed.

It is an object of the present invention to provide an apparatus and method for indicating the rotational speed of a ceiling fan.

It is a further object of the invention to indicate the rotational speed of a ceiling fan utilizing coded indicator lights mounted in the body of the ceiling fan.

It is an additional object of the invention to provide an apparatus and method for transmitting electrical power to indicator lights mounted in a ceiling fan to cause the indicator lights to turn on and off in a specific predetermined sequence to indicate the rotational speed of the ceiling fan.

Other and further objects, features and advantages of the present invention will be readily apparent to those skilled in the art when the following description of the preferred embodiment is read in conjunction with the accompanying drawings.

BRIEF DESCRIPTION OF THE DRAWINGS

FIG. 3 depicts a circuit diagram of the inner layer of the fan switch for a coil-tapped type fan motor circuit showing the switch connections to the electrical circuit of the invention when the fan switch is in an "off" position;

FIG. 4 depicts a circuit diagram of the inner layer of the fan switch for a coil-tapped type fan motor circuit showing the switch connections to the electrical circuit of the invention when the fan switch is in a "high speed" position;

FIG. 5 depicts a circuit diagram of the inner layer of the fan switch for a coil-tapped type fan motor circuit showing the switch connections to the electrical circuit of the invention when the fan switch is in a "medium speed" position;

FIG. 6 depicts a circuit diagram of the inner layer of the fan switch for a coil-tapped type fan motor circuit showing the switch connections to the electrical circuit of the invention when the fan switch is in a "low speed" position; and FIG. 7 depicts a circuit diagram of a typical ceiling fan with a capacitor phase shift type fan motor circuit showing the electrical connection of the electrical circuit of the invention.

DETAILED DESCRIPTION OF THE PREFERRED EMBODIMENT

Figure 1:
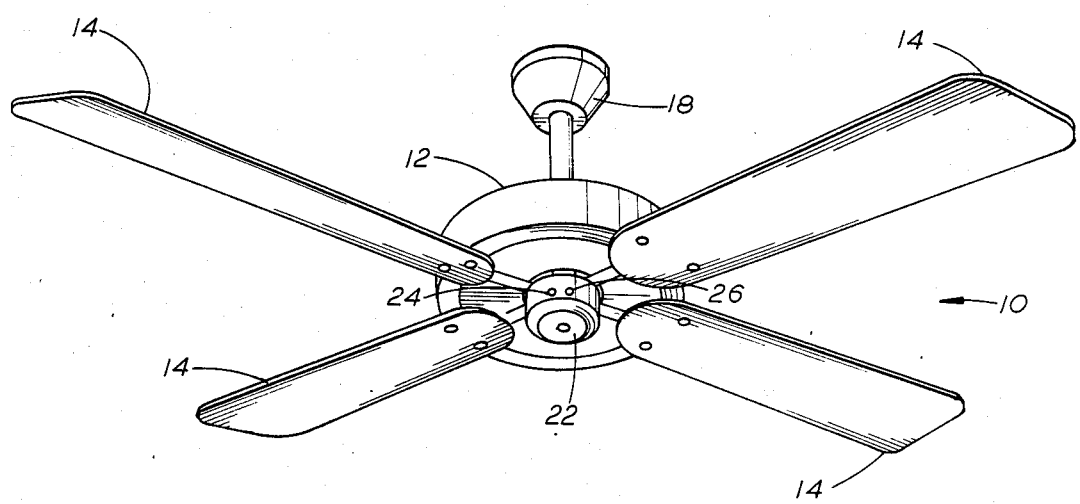
FIG. 1 depicts a typical ceiling fan showing the placement two-indicator lights in the body of the fan.

The operation of the apparatus and method of the present invention may be best understood with reference to the drawings and the detailed description set forth below. The numeral 10 shall designate a ceiling fan such as that depicted in FIG. 1. The fan 10 comprises a body 12, a set of blades 14 rotatably mounted with respect to said body 12, a motor 16 (not shown in FIG. 1) mounted within said body 12 for rotating said set of blades 14 and mounting means 18 for mounting said fan 10 on a ceiling. The motor 16 of fan 10 is driven by electricity from an electrical power cable 20 (not shown in FIG. 1) that connects to motor 16 through the mounting means 18 that support the fan 10 from the ceiling.

As shown in FIG. 1, fan 10 also comprises a housing 22 mounted beneath the body 12 and the set of blades 14. Housing 22 does not rotate with the set of blades 14 but remains stationary. Housing 22 contains a portion of the electrical circuitry for operating motor 16. In some models of ceiling fans, an electric light fixture (not shown) may be placed on the bottom of housing 22 to provide means for illuminating the room in which the ceiling fan is installed.

The present invention may be illustrated by describing the operation of the fan 10 in conjunction with a first indicator light 24 and a second indicator light 26. In the preferred embodiment of the invention, the indicator lights, 24 and 26, are mounted within the housing 22 as shown in FIG. 1. For purposes of easily distinguishing between the two indicator lights, the first indicator light 24 is a red colored neon filled lamp and the second indicator light 26 is an orange colored neon filled lamp.

The indicator lamps, 24 and 26, are part of an electrical circuit 28 connected to and operable with the electrical wiring of the ceiling fan 10. Because the electrical wiring of ceiling fans is not standardized, there may be several ways in which the indicator lamps, 24 and 26, and the electrical circuit 28 may be connected within the electrical wiring of the ceiling fan 10. The preferred embodiment of the present invention will be described for the case of two well-known types of ceiling fan motor circuitry, the coil-tapped type fan motor circuitry and the phase shift type fan motor circuitry.

Figure 2:
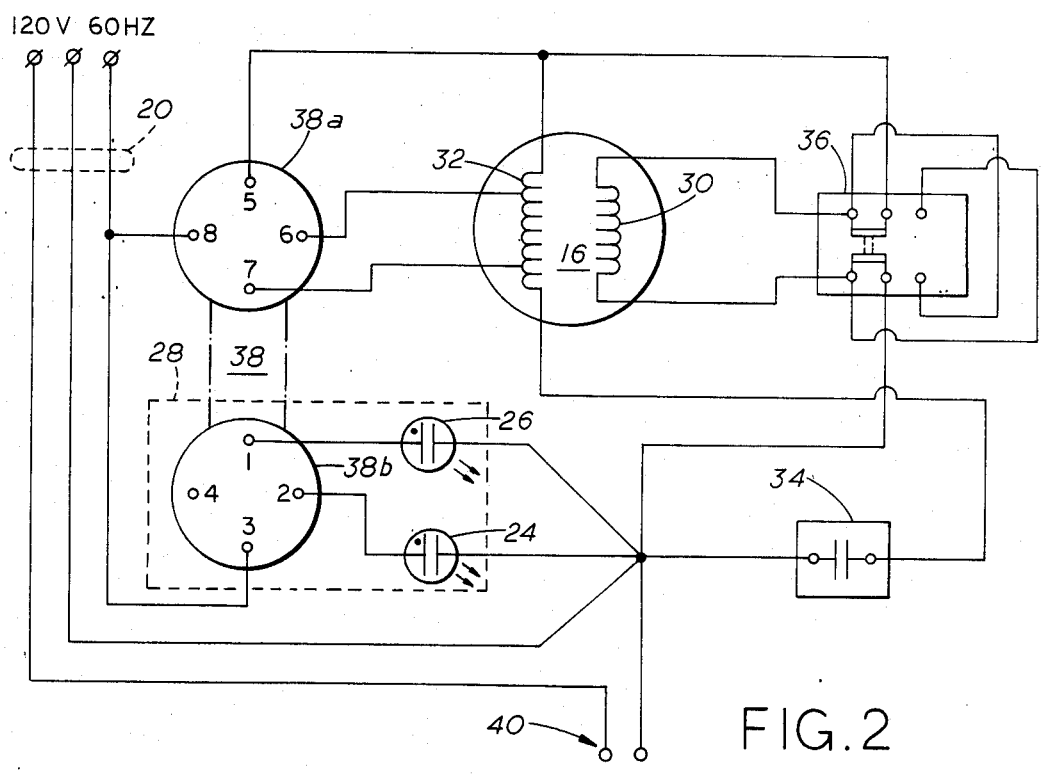
FIG. 2 depicts a circuit diagram of a typical ceiling fan with coil-tapped type fan motor circuit showing the electrical connection of the electrical circuit of the invention.

FIG. 2 depicts the circuitry for a typical coil-tapped fan motor. The motor 16 is schematically shown comprising a main winding 30 and an auxiliary winding 32. Other components include a capacitor circuit 34 for starting the motor 16 and a reversing switch 36 for reversing the direction of motion of the set of blades 14. Electrical power cable 20 provides electrical power to the motor 16 through a switch 38 comprising an outer layer 38a and an inner layer 38b. As shown in FIG. 2, the electrical circuit 28 of the present invention comprises the inner layer 38b of switch 38 and the indicator lights, 24 and 26. The operation of electrical circuit 28 will be described more fully below. Electrical power cable 20 may also supply power to an optional light fixture terminal 40.

Switch 38 selects the different speeds of the fan 10 which in this example are the three speeds of High, Medium and Low. In addition, switch 38 also has a power off position. Switch 38 comprises a conventional pull chain switch modified by the addition of inner layer 38b of electrical circuit 28. In the switch 38 depicted in FIG. 2, the terminals 1, 2 and 3 of inner layer 38b are electrically connected to the corresponding terminals 5, 6 and 7 of outer layer 38a. But terminal 4 of inner layer 38b and terminal 8 of outer layer 38a are not electrically connected.

Turning now to a description of the operation of switch 38, it will be demonstrated how the switch 38 operates to turn on the indicator lights, 24 and 26, in accordance with the following code:

|  | Fan Speed | | | |
| --- | --- | --- | --- | --- |
|  | High | Medium | Low | Off |
| Indicator Light 24 (Red) | On | On | Off | Off |
| Indicator Light 26 (Orange) | On | Off | On | Off |

That is to say, when both indicator lights, 24 and 26, are on, then the fan 10 is operating at high speed. When indicator light 24 is on and indicator light 26 is off, then the fan 10 is operating at medium speed. When the indicator light 24 is off and indicator light 26 is on, then the fan 10 is operating at low speed. When both indicator lights, 24 and 26, are off, then the fan 10 is also off.

The inner layer 38b of switch 38 connects the indicator lights, 24 and 26, to the electrical wiring of the fan 10 in a manner that insures that the correct combination of indicator lights is always chosen for a given fan speed. This is accomplished by means of a three position rotor 42 pivotally mounted on a shaft 43 within switch 38. Rotor 42 is constructed having three rotor arms 44a, 44b and 44c, each of which contacts one of the four terminals 1, 2, 3 or 4 depending upon the position of switch 38. The contact that the rotor arms 44a, 44b and 44c make with the four terminals 1, 2, 3 and 4 may be clearly seen with reference to FIGS. 3–6. The three rotor arms 44a, 44b and 44c are electrically connected to each other.

FIG. 3 depicts the position of rotor 42 within the inner layer of 38b of switch 38 in which the switch 38 is set in an "off" position. In the "off" position, rotor arm 44a is in contact with terminal 8, rotor arm 44b is in contact with terminal 1 and rotor arm 44c is in contact with terminal 2. Because no rotor arm of rotor 42 is in contact with terminal 3, the electrical power from the line of cable 20 connected to terminal 3 does not pass to either terminal 1 or terminal 2. Because terminal 8 of outer layer 38a is not electrically connected to the corresponding terminal 4 of inner layer 38b, no electrical power passes from outer layer 38a to the rotor arm 44a of rotor 42 of inner layer 38b. Therefore, neither indicator light 24 nor indicator light 26 is turned on when the switch 38 is in "off" position.

The shaft 43 on which rotor 42 is mounted extends vertically through switch 38 and supports a similar rotor (not shown) with similar rotor arms (not shown) that connect the corresponding terminals 5, 6, 7 and 8 of outer layer 38a of switch 38. As the rotor of outer layer 38a is rotated through each of its positions for "low speed," "medium speed," "high speed" and "off," the contacts that the rotor arms of the rotor of outer layer 38a make with the terminals 5, 6, 7 and 8 of outer layer 38a of switch 38 permit electrical power from the line of electrical power cable 20 that is connected to terminal 8 of outer layer 38a to drive the motor 16 of fan 10. Simultaneously, the contacts that the rotor arms 44 of rotor 42 of inner layer 38b make with the corresponding terminals 1, 2, 3 and 4 of inner layer 38b of switch 38 permit electrical power from the line of electrical power cable 20 that is connected to terminal 3 of inner layer 38b to turn on the indicator lights, 24 and 26, in the properly coded sequence.

For example, consider what happens when the rotor 42 of the inner layer 38b of switch 38 is rotated one position in a clockwise direction from the initial position shown in FIG. 3. The resulting position shown in FIG. 4 depicts the "high speed" position. In the "high speed" position, rotor arm 44a of rotor 42 is in contact with terminal 1 of inner layer 38b, rotor arm 44b is in contact with terminal 2, and rotor arm 44c is in contact with terminal 3. Electrical power from the line of electrical power cable 20 connected to terminal 3 of inner layer 38b passes through rotor arm 44c and through rotor arm 44b to turn on indicator light 24. Simultaneously, electrical power also passes through rotor arm 44c and through rotor arm 44a to turn on indicator light 26. In this manner, both indicator lights, 24 and 26, are turned on when the motor 16 of fan 10 is set on "high speed."

When the rotor 42 of inner layer 38b of switch 38 is rotated clockwise by one more position, the resulting position is that shown in FIG. 5. The position corresponds to the "medium speed" position of switch 38 for motor 16. In the "medium speed" position, rotor arm 44a of rotor 42 is in contact with terminal 2 of inner layer 38b, rotor arm 44b is in contact with terminal 3, and rotor arm 44c is in contact with terminal 4. Electrical power from the line of electrical power cable 20 connected to terminal 3 of inner layer 38b passes through rotor arm 44b and through rotor arm 44a to turnon indicator light 24. Because no electrical power reaches terminal 1 of inner layer 38b, indicator light 26 is not turned on when switch 38 is in the "medium speed" position.

When the rotor 42 of inner layer 38b of switch 38 is rotated clockwise by one more position, the resulting position is that shown in FIG. 6. The position corresponds to the "low speed" position of switch 38 for motor 16. In the "low speed" position, rotor arm 44a of rotor 42 is in contact with terminal 3 of inner layer 38b, rotor arm 44b is in contact with terminal 4, and rotor arm 44c is in contact with terminal 1. Electrical power from the line of electrical power cable 20 connected to terminal 3 of inner layer 38b passes through rotor arm 44a and through rotor arm 44c to turn on indicator light 26. Because no electrical power reaches terminal 2 of inner layer 38b, indicator light 24 is not turned on when switch 38 is in the "low speed" position.

When the rotor 42 of inner layer 38b of switch 38 is rotated clockwise by one more position, the resulting position is once again the "off" position shown in FIG. 3. The rotation of switch 38 through a complete cycle of the four switch positions sequentially selects the four fan speeds "off," "high speed," "medium speed" and "low speed." The indicator lights, 24 and 26, of electrical circuit 28 are sequentially turned on and off in accordance with the coding scheme indicated in the table set forth above. Additional indicator lights and rotor arms may be added in accordance with the above-described coding method to accommodate additional speed settings for the fan motor 16.

The apparatus and method of the present invention for indicating the rotational speed of a fan may be adapted to other types of fan motor circuitry. The circuitry for a typical capacitor phase shift type fan motor is depicted in FIG. 7. As before, motor 16 is schematically shown comprising a main winding 30 and an auxiliary winding 32. Also as in the previous example, there is a capacitor circuit 34 and a reversing switch 36. An electrical power cable 20 provides electrical power to the motor 16 through switch 38 and also provides electrical power to an optional light fixture terminal 40.

As in the previous example given for the coil-tapped type fan motor circuitry, the switch 38 for the capacitor phase shift type fan motor circuitry is divided into an inner layer 38b and an outer layer 38a as shown in FIG. 7. The positions of inner layer 38b and outer layer 38a in FIG. 7 are reversed from the positions they occupied in FIG. 3. That is, in FIG. 7 it is outer layer 38a that is within the electrical circuit 28 of the invention. Also as in the previous example, switch 38 selects the different speeds of the fan 10 which are the speeds of High, Medium and Low. Switch 38 also has a power off position. Unlike the previous example, however, the terminals 5, 6, 7 and 8 of outer layer 38a of the switch 38 depicted in FIG. 7 are all electrically connected to the corresponding terminals 1, 2, 3 and 4 of inner layer 38b.

The electrical connections between terminals 1 and 5, between terminals 2 and 6, between terminals 3 and 7, and between terminals 4 and 8 are necessary to adapt switch 38 to the electrical circuitry of the capacitor phase shift type fan motor. In operation, switch 38 depicted in FIG. 7 operates to turn on the indicator lights, 24 and 26, in accordance with the coding method previously described. The indicator lights, 24 and 26, are turned off and on by the rotation of the rotor and rotor arms of the outer layer 38a of switch 38. The switching mechanism of outer layer 38a shown in FIG. 7 is similar to the previously described switching mechanism of inner layer 38b shown in FIG. 3. Except for the wiring differences necessary to adapt the operation of the switch 38 to the capacitor phase shift type fan motor, the apparatus and method of operation of switch 38 is the same as that previously described for the case of the coil-tapped type fan motor.

Although the preferred embodiment of the invention has been described with particularity, it is to be understood that certain changes or modifications may be made by those skilled in the art without departing from the true spirit and scope of the inventive concepts involved in the invention.

What is claimed is:

1. An apparatus for indicating the rotational speed of a fan capable of rotating at any one of a plurality of speeds, comprising:
   a plurality of indicator lights mounted on said fan; and
   means for selectively providing electrical power to a unique combination of indicator lights of said plurality of indicator lights to indicate a particular rotational speed of said fan.

2. An apparatus for indicating the rotational speed of a fan that is capable of rotating at any one of three speeds, comprising:
   a first indicator-light mounted on said fan; and
   a second indicator light mounted on said fan; and
   electrical circuit means for providing electrical power to said first indicator light and for terminating electrical power to said second indicator light to cause said first indicator light to be on and said second indicator light to be off when said fan rotates at a first speed; and
   electrical circuit means for providing electrical power to said second indicator light and for terminating electrical power to said first indicator light to cause said second indicator light to be on and said first indicator light to be off when said fan rotates at a second speed; and
   electrical circuit means for providing electrical power to said first indicator light and to said second indicator light to cause said first indicator light to be on and to cause said second indicator light to be on when said fan rotates at a third speed; and
   electrical circuit means for terminating electrical power to said first indicator light and to said second indicator light to cause said first indicator light to be off and to cause said second indicator light to be off when said fan is off.

3. An apparatus for indicating the rotational speed of a fan that is capable of rotating at any one of three speeds, comprising:
   a first indicator light mounted on said fan; and
   a second indicator light mounted on said fan; and
   a four-way electrical switch electrically connected between a source of electrical power and an electrical motor for driving said fan,
   said four-way electrical switch comprising an outer layer having four terminals connecting said switch to said source of electrical power and to said electrical motor, an inner layer having four terminals connecting said switch to said source of electrical power and to said first indicator light and to said second indicator light, said inner layer and said outer layer of said switch having three of their respective terminals electrically connected; and
   a rotor rotatably mounted within said switch, said rotor having a first set of three electrically connected rotor arms for electrically connecting three of said four terminals of said outer layer of said switch to transmit electrical power to said electrical motor of said fan to cause said motor to run at one of three different speeds, said rotor also having a second set of three electrically connected rotor arms for electrically connecting three of said four terminals of said inner layer of said switch to transmit electrical power to said first indicator light and to said second indicator light in a coded sequence indicative of the rotational speed of said fan.

4. An apparatus for indicating the rotational speed of a fan that is capable of rotating at any one of three speeds comprising:
   a first indicator light mounted on said fan; and
   a second indicator light mounted on said fan; and
   a four-way electrical switch electrically connected between a source of electrical power and an electrical motor for driving said fan,
      said four-way electrical switch comprising an inner layer having four terminals connecting said switch to said source of electrical power and to said electrical motor, an outer layer having four terminals connecting said switch to said source of electrical power and to said first indicator light and to said second indicator light, said outer layer and said inner layer of said switch having four of their respective terminals electrically connected; and
   a rotor rotatably mounted within said switch, said rotor having a first set of three electrically connected rotor arms for electrically connecting three of said four terminals of said inner layer of said switch to transmit electrical power to said electrical motor of said fan to cause said motor to run at one of three different speeds, said rotor also having a second set of three electrically connected rotor arms for electrically connecting three of said four terminals of said outer layer of said switch to transmit electrical power to said first indicator light and to said second indicator light in a coded sequence indicative of the rotational speed of said fan.

5. A method for indicating the rotational speed of a fan that is capable of rotating at any one of a plurality of speeds, comprising the steps of:
   providing electrical power to a combination of indicator lights of a plurality of indicator lights mounted on said fan when said fan rotates at a first speed of said plurality of speeds; and
   providing electrical power to a different combination of indicator lights of said plurality of indicator lights when said fan rotates at each of the other speeds of said plurality of speeds of said fan.

6. A method for indicating the rotational speed of a fan that is capable of rotating at any one of three speeds, comprising the steps of:
   providing electrical power to a first indicator light mounted on said fan to cause said first indicator light to be on and terminating electrical power to a second indicator light mounted on said fan to cause said second indicator light to be off when said fan rotates at a first speed; and
   providing electrical power to said second indicator light to cause said second indicator light to be on and terminating electrical power to said first indicator light to cause said first indicator light to be off when said fan rotates at a second speed; and
   providing electrical power to said first indicator light and to said second indicator light to cause said first indicator light to be on and to cause said second indicator light to be on when said fan rotates at a third speed; and
   terminating electrical power to said first indicator light and to said second indicator light to cause said first indicator light to be off and to cause said second indicator light to be off when said fan is off.

* * * * *